Feb. 17, 1942.   A. E. MALMER   2,273,492
SPRING CLIPS
Filed July 8, 1941
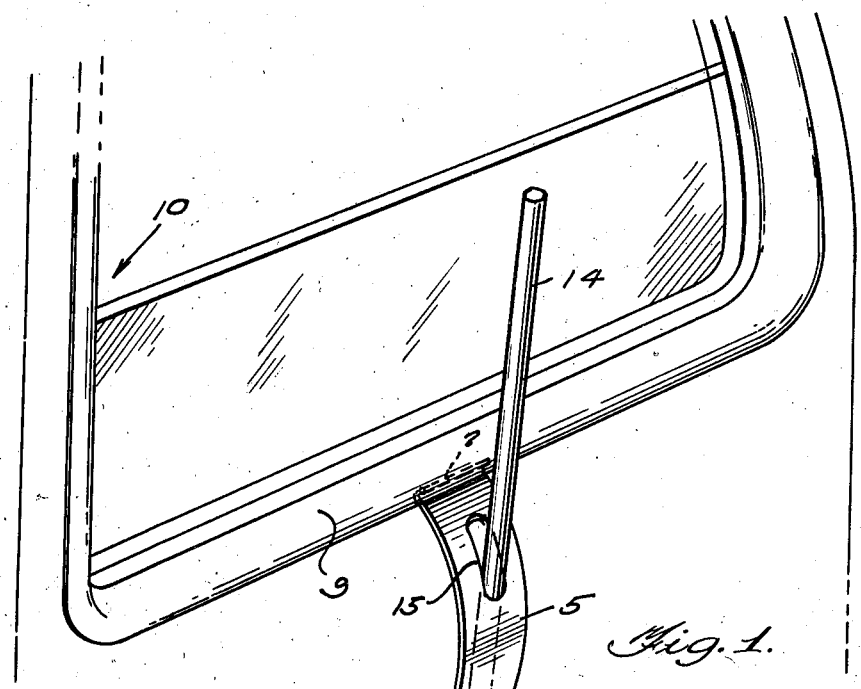
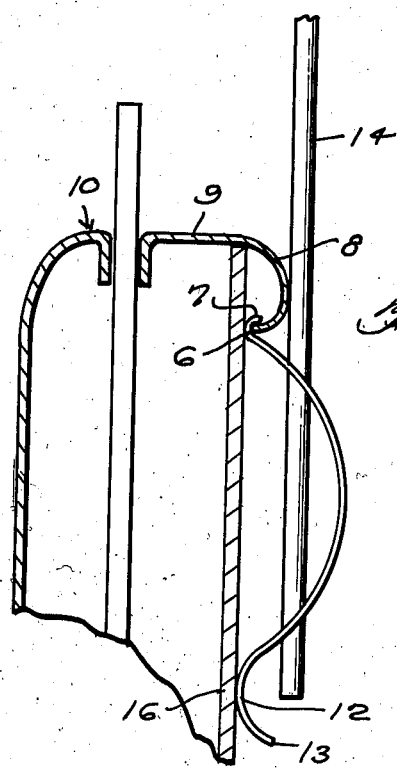
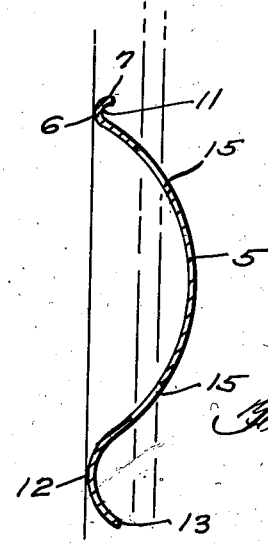
Inventor
ALBERT E. MALMER,
By Clarence A. O'Brien
Attorney Patented Feb. 17, 1942

2,273,492

UNITED STATES PATENT OFFICE 2,273,492

SPRING CLIPS

Albert E. Malmer, Blue Island, Ill.

Application July 8, 1941, Serial No. 401,488

2 Claims. (Cl. 248—43)

This invention relates to spring clips, and an object of the invention is to provide a clip of this character particularly designed for use in conjunction with the windows of automobile bodies and the like for the purpose of suspending within the body various accessories such as ash trays, clocks, mirrors, thermometers, compasses, window anti-rattlers, flags, fan motors, license card holders, cigarette packages, signs and the like; and the invention together with its objects and advantages will be best understood from a study of the following description taken in connection with the accompanying drawing wherein:

Figure 1 is a perspective view of the clip illustrating an application of the same.

Figure 2 is a side elevational view of the clip further illustrating one manner of using the same.

Figure 3 is a longitudinal sectional view through the clip.

Referring more in detail to the drawing, it will be seen that the clip embodying the features of the present invention is indicated generally by the reference numeral 5.

The clip 5 is formed from a single length of spring metal that is longitudinally bowed as shown.

At one end thereof the metal body of the clip 5 is reversely bent upon itself as at 6 to provide a short transverse lip 7 to engage the inner side of the free edge of the inner bead 8 of the sill 9 of an automobile window frame indicated generally by the reference numeral 10 and fragmentarily shown in the drawing. It will be seen that with the lip 7 so engaged with the bead 8, the aforementioned free edge of the bead fits within a channel or groove 11 provided therefor by bending the clip 5 in the manner just stated.

At the opposite end thereof the body of the clip 5 is reversely bent as at 12 and the arc of the bend 12 is very material and pronounced, forming at the extremity of the clip body 5 a lip 13 that serves, as, for example, a rest for the lower end of a rod or the like 14 for which the clip 5 may be used to constitute a support.

The clip 5 inwardly from the ends 6 and 12 thereof is provided with slots 15 that are elongated longitudinally of the clip body and are, as shown in Figure 1, adapted to have threaded therethrough one end of the rod 14.

It will be appreciated that the rod 14 may be in the nature of a flag pole or may be used as an impaling prong from which clocks, thermometers, compasses, and the like may be suspended by passing the suspension ring with which such articles are usually equipped over the upper end of the rod.

The rod 14, when used with the clip 5 in the manner illustrated, acts in opposition to the tension of the clip with the result that the lower end 12 of the clip is caused to bias inwardly into pressing contact with the wall 16 of the automobile body or automobile door, as the case may be.

Consequently the spring 5 has a tendency to expand or "stretch" longitudinally thus urging the end 6 upwardly behind the bead 8 insuring positive engagement of said end 6 of the clip with the edge of the bead 8 of the window sill.

It will be further noted, as shown in Figure 2, that the upper portion of the rod 14 will have bearing contact with the bead 8 and sufficient friction is set up between the rod 14 and the bead 8 as to secure the rod 14 against casual vertical movement, or movement perpendicularly.

It will thus be seen that with a clip of this character various accessories such as ash trays, clocks, mirrors, thermometers, compasses, window anti-rattlers, flags, fan motors, license card holders, cigarettes, signs and the like may be readily suspended interiorly of an automobile body; that the clip will fit any car window having a metal sill which is rolled under, such as characterizes the sill herein illustrated; and that the clip when applied will not interfere with the opening or closing of the window, and can be easily mounted or demounted without marring the finished surface of the sill.

While I have herein illustrated and described what is considered the preferred embodiment of the invention, I am well aware that in practical fields alterations in the details may be resorted to without departing from the invention as defined in the appended claims, and therefore I claim all such forms of the invention to which I am entitled.

Having thus described the invention what is claimed as new is:

1. A spring clip for the purpose specified comprising a narrow spring metal body longitudinally curved and having at one end a reverse bend for positively engaging said end of the clip with the inside bead of a window sill, and said clip at the opposite end thereof having a pronounced returned bend for bearing engagement with the wall beneath the sill; and said clip body being provided adjacent the ends thereof with slots elongated longitudinally of the clip body.

2. A spring clip for the purpose specified comprising a narrow spring metal body longitudinally curved and having at one end a reverse bend for positively engaging said end of the clip with the inside bead of a window sill, and said clip at the opposite end thereof having a pronounced returned bend for bearing engagement with the wall beneath the sill; and said clip body being provided adjacent the ends thereof with slots elongated longitudinally of the clip body, and a rod threaded through said slots, as and for the purpose specified.

ALBERT E. MALMER.